(12) United States Patent
Nakashima

(10) Patent No.: US 11,635,909 B2
(45) Date of Patent: Apr. 25, 2023

(54) DISK ARRAY DEVICE, CONTROL METHOD FOR DISK ARRAY DEVICE, AND CONTROL PROGRAM FOR DISK ARRAY DEVICE

(71) Applicant: NEC Platforms, Ltd., Kawasaki (JP)

(72) Inventor: Toshitaka Nakashima, Kanagawa (JP)

(73) Assignee: NEC PLATFORMS, Ltd., Kanagawa (JP)

( * ) Notice: Subject to any disclaimer, the term of this patent is extended or adjusted under 35 U.S.C. 154(b) by 0 days.

(21) Appl. No.: 16/963,705

(22) PCT Filed: Feb. 20, 2019

(86) PCT No.: PCT/JP2019/006236
§ 371 (c)(1),
(2) Date: Jul. 21, 2020

(87) PCT Pub. No.: WO2019/163806
PCT Pub. Date: Aug. 29, 2019

(65) Prior Publication Data
US 2021/0081137 A1  Mar. 18, 2021

(30) Foreign Application Priority Data
Feb. 26, 2018 (JP) .............................. JP2018-031468

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/064* (2013.01);
(Continued)

(58) Field of Classification Search
CPC ...... G06F 3/0655; G06F 3/0604; G06F 3/064; G06F 3/065; G06F 3/0652; G06F 3/0679; G06F 3/0689; G06F 3/061; G06F 12/00
See application file for complete search history.

(56) References Cited

U.S. PATENT DOCUMENTS 10,216,578 B2 * 2/2019 Lee ..................... G06F 3/0616
2009/0077302 A1   3/2009 Fukuda
(Continued)

FOREIGN PATENT DOCUMENTS

JP   H11-175409 A    7/1999
JP   2009-075658 A   4/2009
(Continued)

OTHER PUBLICATIONS

International Search Report for PCT Application No. PCT/JP2019/006236, dated Apr. 23, 2019.
(Continued)

*Primary Examiner* — Craig S Goldschmidt

(57) ABSTRACT

A control method includes: converting a first write command received from a host to a second write command for each SSD belonging to an active pool, holding, with respect to the SSD, an end address of data written in the immediately prior second write command, and holding a discontinuity count, which is the number of times the end address and the write address for the newest second write command are discontinuous; and when the discontinuity count for a first SSD among the SSDs belonging to the active pool exceeds an upper limit value, copying a plurality of data, for all of the data held by the first SSD, to a region to which the write address is continuous in a second SSD that belongs to a standby pool and is initialized, deleting the first SSD from the active pool, and adding the second SSD to the active pool.

3 Claims, 13 Drawing Sheets

(52) U.S. Cl.
CPC ............ *G06F 3/065* (2013.01); *G06F 3/0652* (2013.01); *G06F 3/0679* (2013.01)

(56) References Cited

U.S. PATENT DOCUMENTS

| | | | |
|---|---|---|---|
| 2013/0282955 A1* | 10/2013 | Parker | G06F 12/0246 711/103 |
| 2014/0215129 A1* | 7/2014 | Kuzmin | G06F 12/0246 711/103 |
| 2014/0289449 A1 | 9/2014 | Ogata | |
| 2017/0153955 A1* | 6/2017 | Lee | G06F 3/0614 |
| 2017/0293553 A1* | 10/2017 | Heller | G06F 12/0246 |

FOREIGN PATENT DOCUMENTS

| | | |
|---|---|---|
| JP | 2016-192025 A | 11/2016 |
| WO | 2014/049678 A1 | 4/2014 |
| WO | 2016/002325 A1 | 1/2016 |

OTHER PUBLICATIONS

English translation of Written opinion for PCT Application No. PCT/JP2019/006236, dated Apr. 23, 2019.

* cited by examiner

DISK ARRAY DEVICE, CONTROL METHOD FOR DISK ARRAY DEVICE, AND CONTROL PROGRAM FOR DISK ARRAY DEVICE

This application is a National Stage Entry of PCT/JP2019/006236 filed on Feb. 20, 2019, which claims priority from Japanese Patent Application JP2018-031468 filed on Feb. 26, 2018, the contents of all of which are incorporated herein by reference, in their entirety.

TECHNICAL FIELD

The present invention relates to a technique for resolving fragmentation in an SSD constituting a disk array device.

BACKGROUND ART

When, in a solid state drive (SSD), write (a random write access) of a series of pieces of data (random data) in a discontinuous physical address is repeated, a storage region (vacant region) where data are not stored on the SSD is gradually subjected to fragmentation. Fragmentation of a vacant region in an SSD decreases a write speed in the SSD.

In an SSD, deletion of data is performed in a block unit (such as 512 KB). In contrast, write of data is performed in a page unit (such as 512 B or 4 KB) smaller than a block. Therefore, in order to overwrite new data onto a part of a block where data are already written, it is necessary to read data written on the block, then delete the whole block, and write, onto the block, data acquired by updating the read data by using new data. Therefore, fragmentation of a vacant region in an SSD markedly decreases a write speed of data in the SSD. Such fragmentation of a vacant region is likely to occur in write of random data, compared with write of a series of pieces of data (sequential data) in a continuous physical address.

One example of a technique for detecting random data is disclosed in PTL 1. A storage device in PTL 1 determines that data to be written are random data when the data to be written have a length equal to or less than a predetermined length or when a write request for the data to be written is not a write request for a continuous address. The storage device duplicates, when the number of random write accesses is larger than a predetermined number of times and the like, data stored in a disk-shaped storage device to a non-volatile memory device. The storage device receives a data read request from a host device and reads, when corresponding data are stored in the non-volatile memory device, the data from the non-volatile memory device. As a result of the configuration described above, in the storage device in PTL 1, access performance is increased.

One example of a technique for substituting, by using a page of a standby memory, a page where failures frequently occur in an operation memory is disclosed in PTL 2. A memory control method in PTL 2 converts, by using a translation look-aside buffer (TLB), a logical page to a physical page of the operation memory. The present memory control method registers, when failures frequently occur in a certain physical page, the physical page in a fault/substitution list table. The present memory control method reads a content from the page of the operation memory and copies the read content to a substitution designation page of the standby memory. The present memory control method rewrites a physical page in the TLB to a page of the standby memory from the operation memory. As a result of the configuration described above, the memory control method in PTL 2 substitutes a page of the operation memory where failures frequently occur with a page of the standby memory.

In the techniques disclosed in PTL 1 and PTL2, it is difficult to resolve fragmentation of a vacant region. Fragmentation of a vacant region in an SSD is resolved by continuously relocating a region where data are written and a vacant region in a storage region.

One example of a technique for resolving fragmentation in an SSD is disclosed in PTL 3. An SSD storage system in PTL 3 includes two SSDs constituting redundant arrays of inexpensive disks (RAID) 1, a standby spare SSD, and a RAID controller. The RAID controller includes an invalid-page-number count unit, a threshold-value-exceeding detection unit, a spare-SSD write unit. The invalid-page-number count unit counts an invalid page number in a state where invalid data are already written in each block inside an SSD. The invalid data are data having been logically deleted (invalidated) after written but being not deleted physically. The threshold-value-exceeding detection unit detects, when detecting a block where an invalid page number exceeds a predetermined page number threshold value, the block as a target block being a target for garbage collection. The spare-SSD write unit stops a write operation for a target block and writes data to be written on the target block onto any block of a spare SSD. An SSD includes a garbage collection execution unit. The garbage collection execution unit executes, by using a target block and a block designated optionally, garbage collection for the target block. As a result of the configuration described above, the SSD storage system in PTL 3 prevents a decrease in a write response even when garbage collection occurs.

CITATION LIST

Patent Literature

[PTL 1] Japanese Unexamined Patent Application Publication No. 2009-075658
[PTL 2] Japanese Unexamined Patent Application Publication No. 11-175409
[PTL 3] Japanese Unexamined Patent Application Publication No. 2016-192025

SUMMARY OF INVENTION

Technical Problem

However, in the SSD storage system in PTL 3, in order to determine whether garbage collection is required, the invalid-page-number count unit repeatedly counts an invalid page number in each block inside an SSD. Commonly, one block includes several ten to several hundred pages, and one SSD includes several ten to several hundred blocks. Therefore, in the SSD storage system in PTL 3, there is a problem that a load required for counting an invalid page number is high.

In view of the above-described problem the present invention has been made, and a main object thereof is to reduce a load required for determining whether defragmentation in a disk array device is required.

Solution to Problem

According to one aspect of the present invention, a disk array device includes: a plurality of solid state drives (SSDs) that each determines, when write data and a physical address indicating a write destination of the write data are provided, an internal address in a page having a predetermined size to be written with the write data, stores, as an address mapping table, a correspondence relation between the physical address and the determined internal address, is able to write the write data in the determined internal address, is able to delete the written write data as a unit of a block including a predetermined number of pages, and is able to initialize the address mapping table when all the write data are deleted; an input/output control means that converts a first write instruction received from a host to a second write instruction for each of the SSDs, among the plurality of SSDs, belonging to an active pool being a group of the SSDs used as a write destination of the write data included in the first write instruction, stores data being able to derive an end address being the internal address indicating an end of the write data written in a second newest of the second write instruction for the SSD, and stores a discontinuity count indicating that the derived end address and the internal address indicating a write destination in the newest second write instruction are discontinuous; and a replacement control means that, when the discontinuity count relating to a first SSD among the SSDs belonging to the active pool exceeds a predetermined upper limit value, indicating an allowable decrease in write capacity in the first SSD, of the discontinuity count relating to the first SSD, copies, with respect to all the write data stored on the first SSD, a plurality of pieces of the write data to a region where write destination addresses are continuous in a second SSD belonging to a standby pool being a group of the SSDs being not used as a write destination of the write data included in the first write instruction among the plurality of SSDs and including the initialized address mapping table, deletes the first SSD from the active pool, and adds the second SSD to the active pool.

According to one aspect of the present invention, a control method for a disk array device including a plurality of solid state drives (SSDs) that each determines, when write data and a physical address indicating a write destination of the write data are provided, an internal address in a page having a predetermined size to be written with the write data, stores, as an address mapping table, a correspondence relation between the physical address and the determined internal address, is able to write the write data in the determined internal address, is able to delete the written write data as a unit of a block including a predetermined number of the pages, and is able to initialize the address mapping table when all the write data are deleted, the method executing: an input/output control procedure of converting a first write instruction received from a host to a second write instruction for each of the SSDs, among the plurality of SSDs, belonging to an active pool being a group of the SSDs used as a write destination of the write data included in the first write instruction, storing data being able to derive an end address being the internal address indicating an end of the write data written in a second newest of the second write instruction for the SSD, and storing a discontinuity count indicating that the derived end address and the internal address indicating a write destination in the newest second write instruction are discontinuous; and a replacement control procedure of, when the discontinuity count relating to a first SSD among the SSDs belonging to the active pool exceeds a predetermined upper limit value, indicating an allowable decrease in write capacity in the first SSD, of the discontinuity count relating to the first SSD, copying, with respect to all the write data stored on the first SSD, a plurality of pieces of the write data to a region where write destination addresses are continuous in a second SSD belonging to a standby pool being a group of the SSDs being not used as a write destination of the write data included in the first write instruction among the plurality of SSDs and including the initialized address mapping table, deleting the first SSD from the active pool, and adding the second SSD to the active pool.

According to one aspect of the present invention, a control program for a disk array device causes a computer included in a disk array device including a plurality of solid state drives (SSDs) that each determines, when write data and a physical address indicating a write destination of the write data are provided, an internal address in a page having a predetermined size to be written with the write data, stores, as an address mapping table, a correspondence relation between the physical address and the determined internal address, is able to write the write data in the determined internal address, is able to delete the written write data as a unit of a block including a predetermined number of pages, and is able to initialize the address mapping table when all the write data are deleted, to execute: input/output control processing of converting a first write instruction received from a host to a second write instruction for each of the SSDs, among the plurality of SSDs, belonging to an active pool being a group of the SSDs used as a write destination of the write data included in the first write instruction, storing data being able to derive an end address being the internal address indicating an end of the write data written in a second newest of the second write instruction for the SSD, and storing a discontinuity count indicating that the derived end address and the internal address indicating a write destination in the newest second write instruction are discontinuous; and replacement control processing of, when the discontinuity count relating to a first SSD among the SSDs belonging to the active pool exceeds a predetermined upper limit value, indicating an allowable decrease in write capacity in the first SSD, of the discontinuity count relating to the first SSD, copying, with respect to all the write data stored on the first SSD, a plurality of pieces of the write data to a region where write destination addresses are continuous in a second SSD belonging to a standby pool being a group of the SSDs being not used as a write destination of the write data included in the first write instruction among the plurality of SSDs and including the initialized address mapping table, deleting the first SSD from the active pool, and adding the second SSD to the active pool.

Advantageous Effects of Invention

According to the present invention, an advantageous effect of being able to reduce a load required for determining whether defragmentation in a disk array device is required is produced.

EXAMPLE EMBODIMENT

Hereinafter, an example embodiment of the present invention is described in detail with reference to the drawings. In all the drawings, an equivalent component is assigned with the same reference sign, and a description is omitted, as appropriate.

A first example embodiment of the present invention is described.

A configuration according to the present example embodiment is described.

Figure 1:
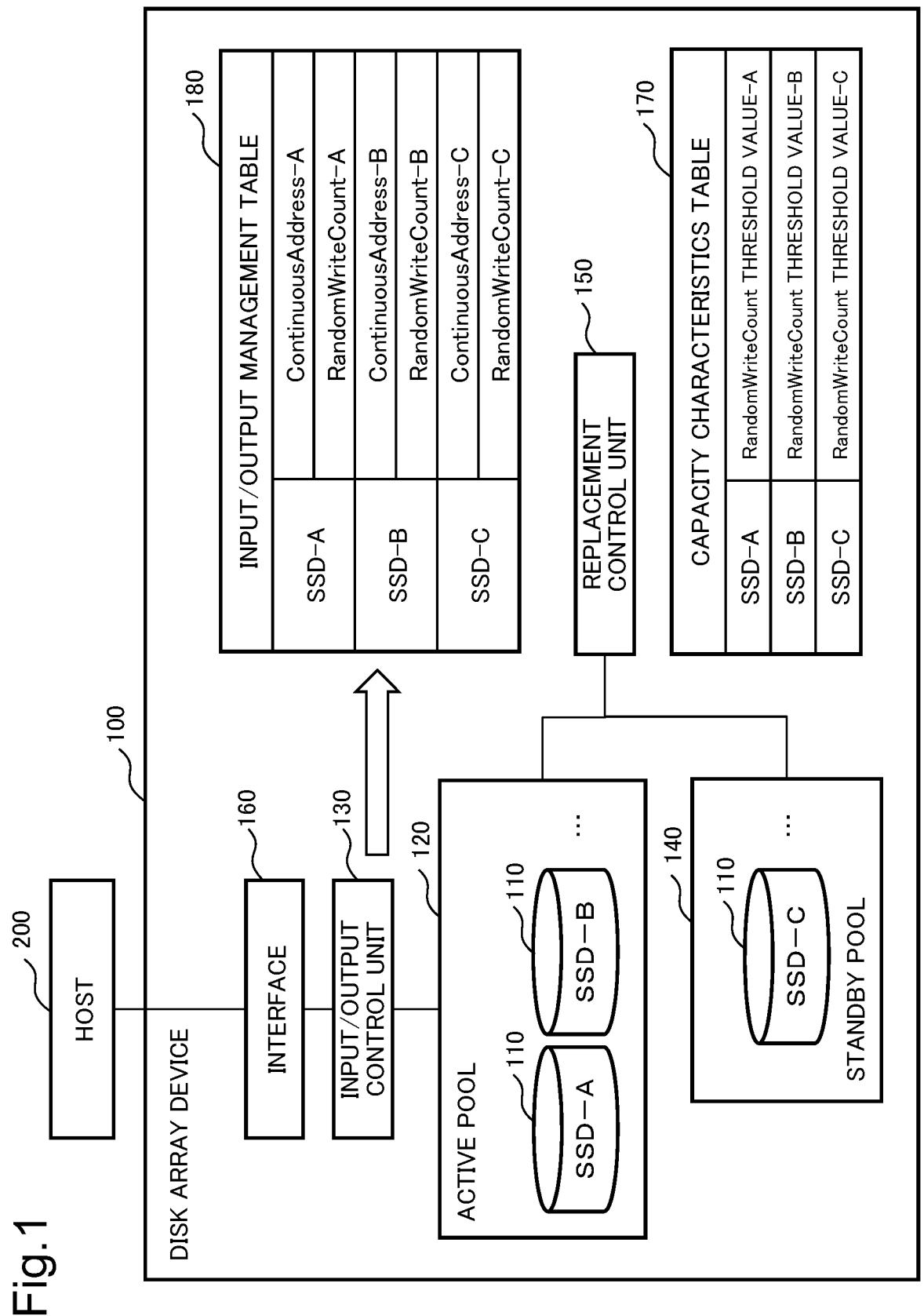
FIG. 1 is a block diagram illustrating one example of a configuration of a disk array device according to a first example embodiment of the present invention.

FIG. 1 is a block diagram illustrating one example of a configuration of a disk array device according to the first example embodiment of the present invention.

A disk array device 100 according to the present example embodiment is connected to a host 200.

The disk array device 100 includes an active pool 120, a capacity characteristics table 170, an input/output management table 180, a standby pool 140, an interface 160, an input/output control unit 130, and a replacement control unit 150.

The active pool 120 is a group of SSDs 110 that each stores written data from the host 200. In FIG. 1, in an initial state, it is assumed that the active pool 120 includes two SSDs 110 (an SSD-A and an SSD-B).

The capacity e characteristics table 170 stores data representing an upper limit value (RandomWriteCount threshold value), previously set, of a discontinuity count (RandomWriteCount) according to a type of each SSD 110. An upper limit value of a discontinuity count may be determined, for example, as a discontinuity count corresponding to an allowable decrease in write capacity in a certain SSD 110.

The input/output management table 180 stores data (ContinuousAddress) representing an address following an end address of data written based on a last write command (write instruction) of each SSD 100 and data (RandomWriteCount) representing the number of writes of data for a discontinuous address.

The SSD 110 allocates, when receiving a write command, a page storing data to a physical address (physical block address (PBA)) in the write command. A page has a predetermined size (such as 512 B or 4 KB). The SSD 110 stores allocation information in an address mapping table (not illustrated) inside the SSD 110. A non-volatile memory (NAND flash memory) used in an SSD has a limited number of writes for the same page. Commonly, an SSD controls (wear leveling) write of data in such a way as to use a page as uniformly as possible. Therefore, in an SSD, fragmentation of a region storing write data and a vacant region is likely to progress. In particular, in write of random data, fragmentation in an SSD markedly progresses, compared with write of sequential data.

The standby pool 140 is a group of standby SSDs 110 for being replaced with an SSD 110 constituting the active pool 120. In FIG. 1, in an initial state, it is assumed that the standby pool 140 includes one SSD 110 (an SSD-C).

The input/output control unit 130 converts input/output to/from the active pool 120 to input/output to/from an SSD 110 belonging to the active pool 120 (such as the SSD-A and the SSD-B). Input/output includes a write instruction. The input/output control unit 130 monitors input/output to/from the SSD 110 and updates the input/output management table 180. Update of the input/output management table 180 includes confirmation of continuity of write destination addresses of data.

The replacement control unit 150 replaces, based on data stored in the capacity characteristics table 170 and the input/output management table 180, an SSD 110 (such as either the SSD-A or the SSD-B) belonging to the active pool 120 with an SSD 110 (such as the SSD-C) belonging to the standby pool 140. The replacement control unit 150 previously deletes, in the SSD 110, when writing new write data onto a part of a block including a plurality of pages on which write data are already written, write data in the whole block. A block includes a predetermined number of pages.

The host 200 reads/writes data for the disk array device 100.

The interface 160 connects the disk array device 100 and the host 200. The interface 160 corresponds to any redundant arrays of inexpensive disks (RAID) technique.

An operation according to the present example embodiment is described.

Figure 2:
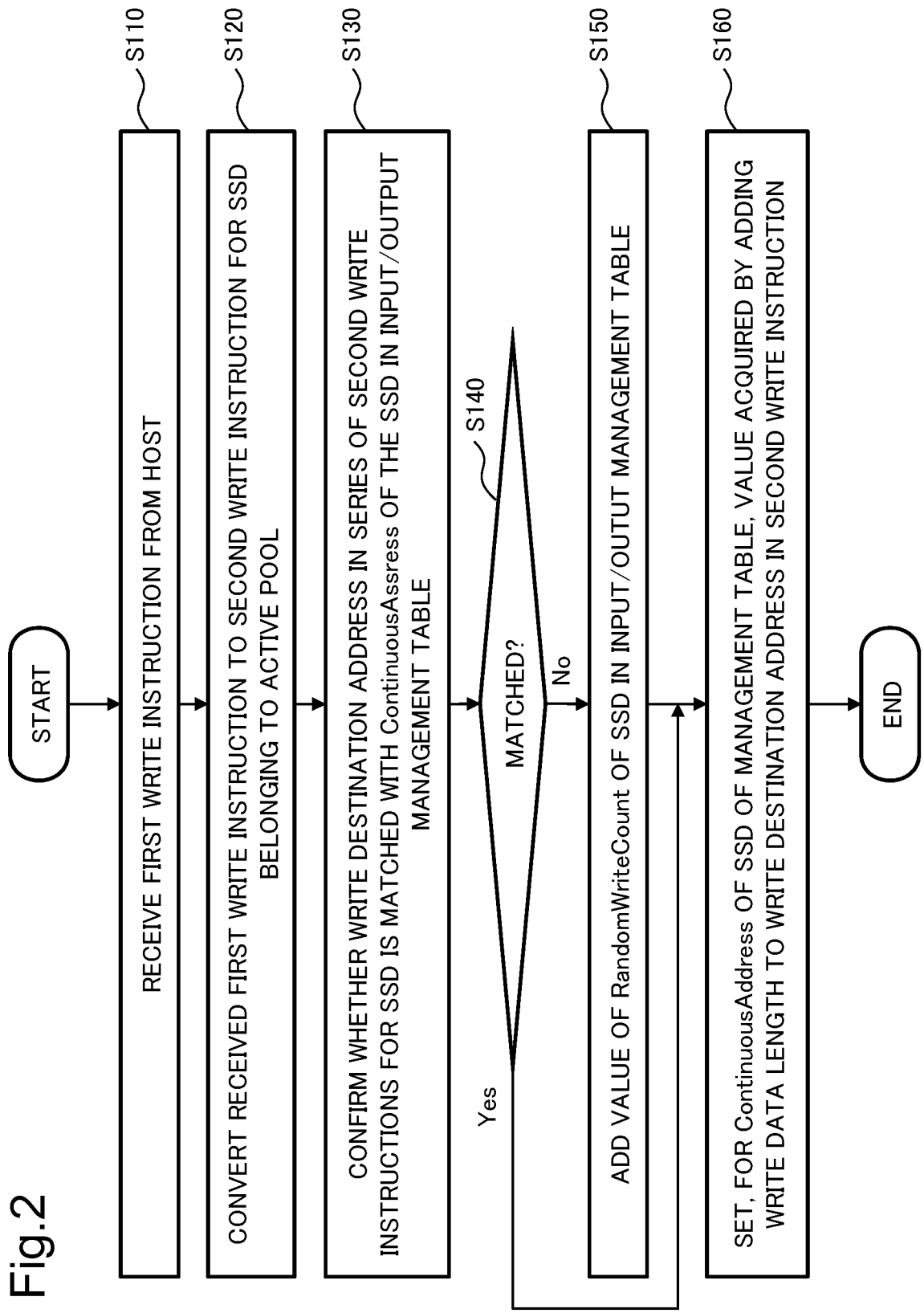
FIG. 2 is a flowchart illustrating an operation of an input/output control unit according to the first example embodiment of the present invention.

FIG. 2 is a flowchart illustrating an operation of the input/output control unit according to the first example embodiment of the present invention. The flowchart illustrated in FIG. 2 and the following description are one example, and according to appropriately required processing, a processing order may be replaced, processing may be returned, or processing may be repeated.

First, the input/output control unit 130 receives, from the host 200, a first write instruction (write command) (step S110).

Next, the input/output control unit 130 converts the received first write instruction (write command) to a second write instruction (write command) for an SSD 110 (such as the SSD-A and the SSD-B) belonging to the active pool 120 (step S120).

Subsequently, the input/output control unit 130 confirms, when data are written onto the SSD 110, whether a write destination address (start address) in the second write instruction issued to the SSD 110 is matched with a ContinuousAddress with respect to the SSD 110 in the input/ output management table 180 (step S130). The input/output management table 180 stores, in the ContinuousAddress for the SSD 110, a value acquired by adding a write data length to a write destination address in a last second write instruction issued to the SSD 110.

When matching is not made (No in step S140), the input/output control unit 130 determines that a newest second write instruction is a write instruction for a discontinuous address and adds 1 to a RandomWriteCount with respect to the SSD 110 in the input/output management table 180 (step S150).

When matching is made (Yes in step S140), the input/output control unit 130 moves processing to step S160.

Subsequently, the input/output control unit 130 sets, for a ContinuousAddress with respect to the SSD 110 in the input/output management table 180, a value acquired by adding a write data length to a write destination address in a second write instruction for the SSD 110 (step S160).

An operation example according to the present example embodiment is described.

Figure 3:
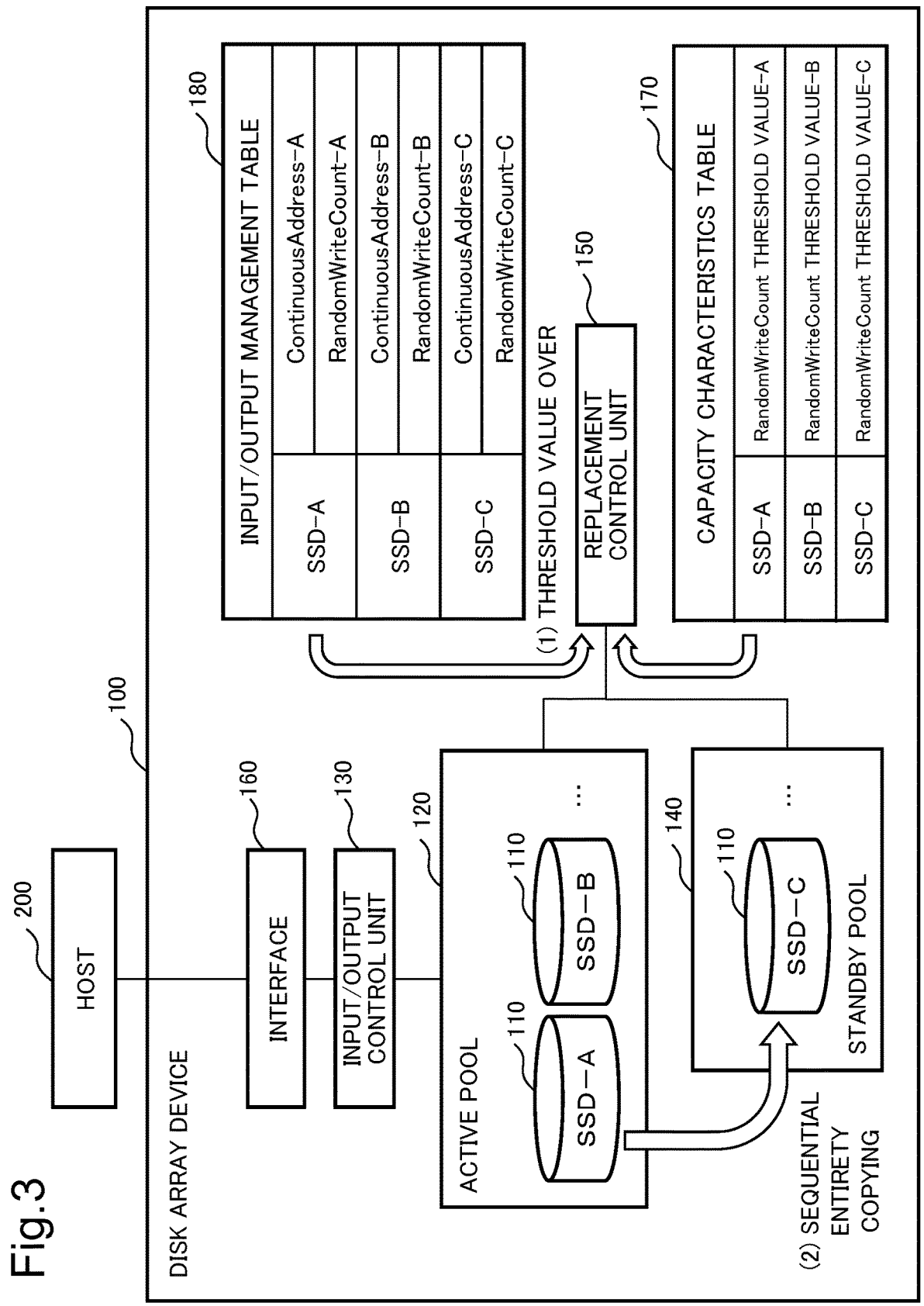
FIG. 3 is a diagram illustrating an anterior half of an operation example of a replacement control unit according to the first example embodiment of the present invention.

FIG. 3 is a diagram illustrating an anterior half of an operation example of the replacement control unit according to the first example embodiment of the present invention.

(1) The replacement control unit 150 confirms whether a RandomWriteCount with respect to the SSD-A in the input/output management table 180 exceeds a RandomWriteCount threshold value with respect to the SSD-A in the capacity characteristics table 170.

(2) When a RandomWriteCount-A exceeds a RandomWriteCount threshold value-A, the replacement control unit 150 copies write data for the SSD-A to the SSD-C belonging to the standby pool 140 sequentially from a top address of a PBA in such a way that fragmentation does not occur.

Figure 4:
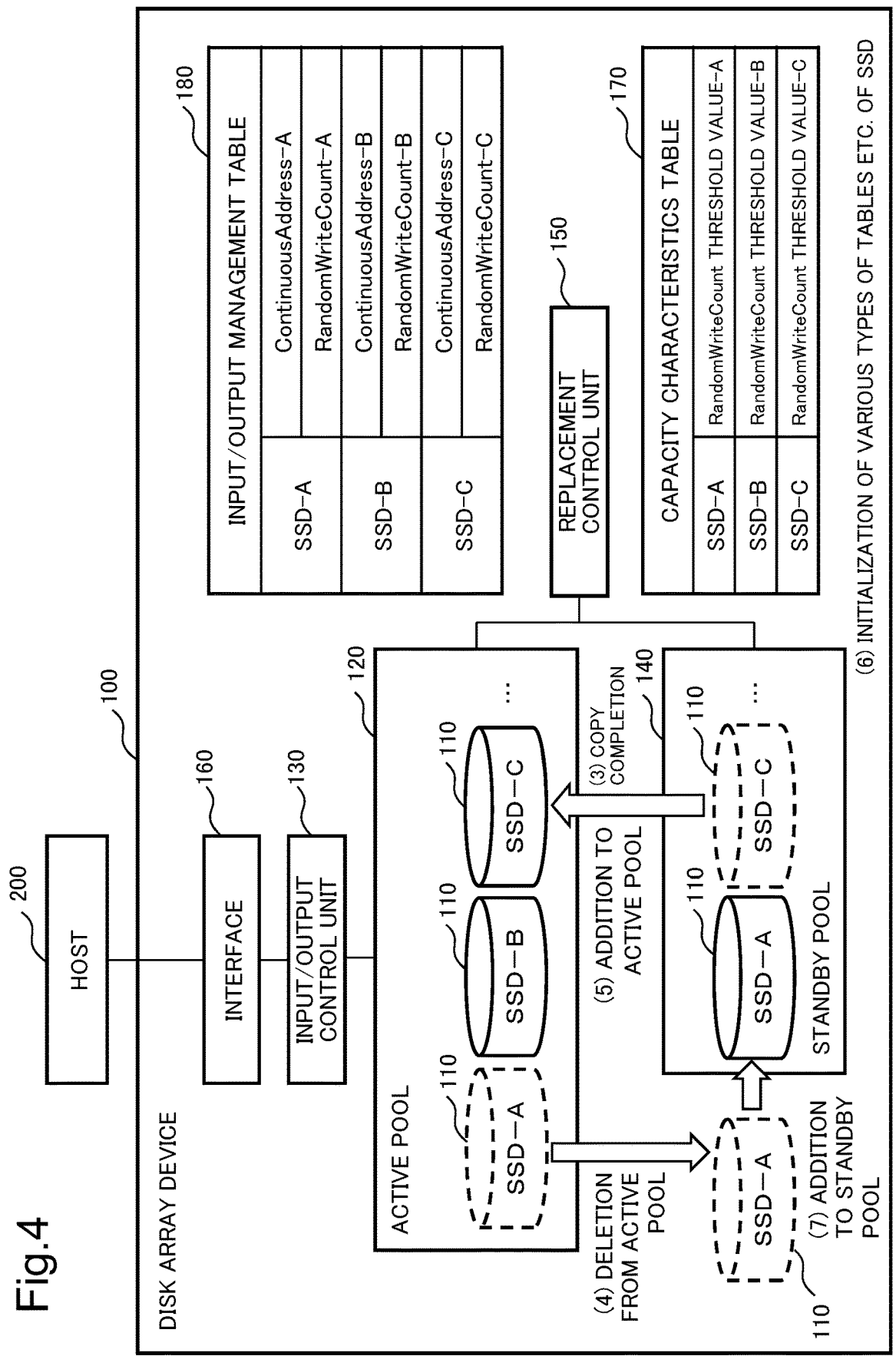
FIG. 4 is a diagram illustrating a posterior half of the operation example of the replacement control unit according to the first example embodiment of the present invention.

FIG. 4 is a diagram illustrating a posterior half of the operation example of the replacement control unit according to the first example embodiment of the present invention.

(3) The replacement control unit 150 completes data copying from the SSD-A to the SSD-C.

(4) The replacement control unit 150 deletes the SSD-A from the active pool 120.

(5) The replacement control unit 150 adds the SSD-C to the active pool 120.

(6) The replacement control unit 150 initializes information relating to the SSD-A in the input/output management table 180 and an address mapping table inside the SSD-A, also deletes data in the SSD-A (hereinafter, referred to also as "initialization" of the SSD-A). Initialization of an SSD is achieved by using, for example, a TRIM command or a Secure Erase command of serial advanced technology attachment (SATA) or an UNMAP command of serial attached small computer system interface (SAS) and the like. In other words, according to the present example embodiment, initialization of an SSD is achieved by using a standard function provided in a commercially available SSD.

(7) The replacement control unit 150 adds the SSD-A to the standby pool 140.

Return to description of the operation according to the present example embodiment.

Figure 5:
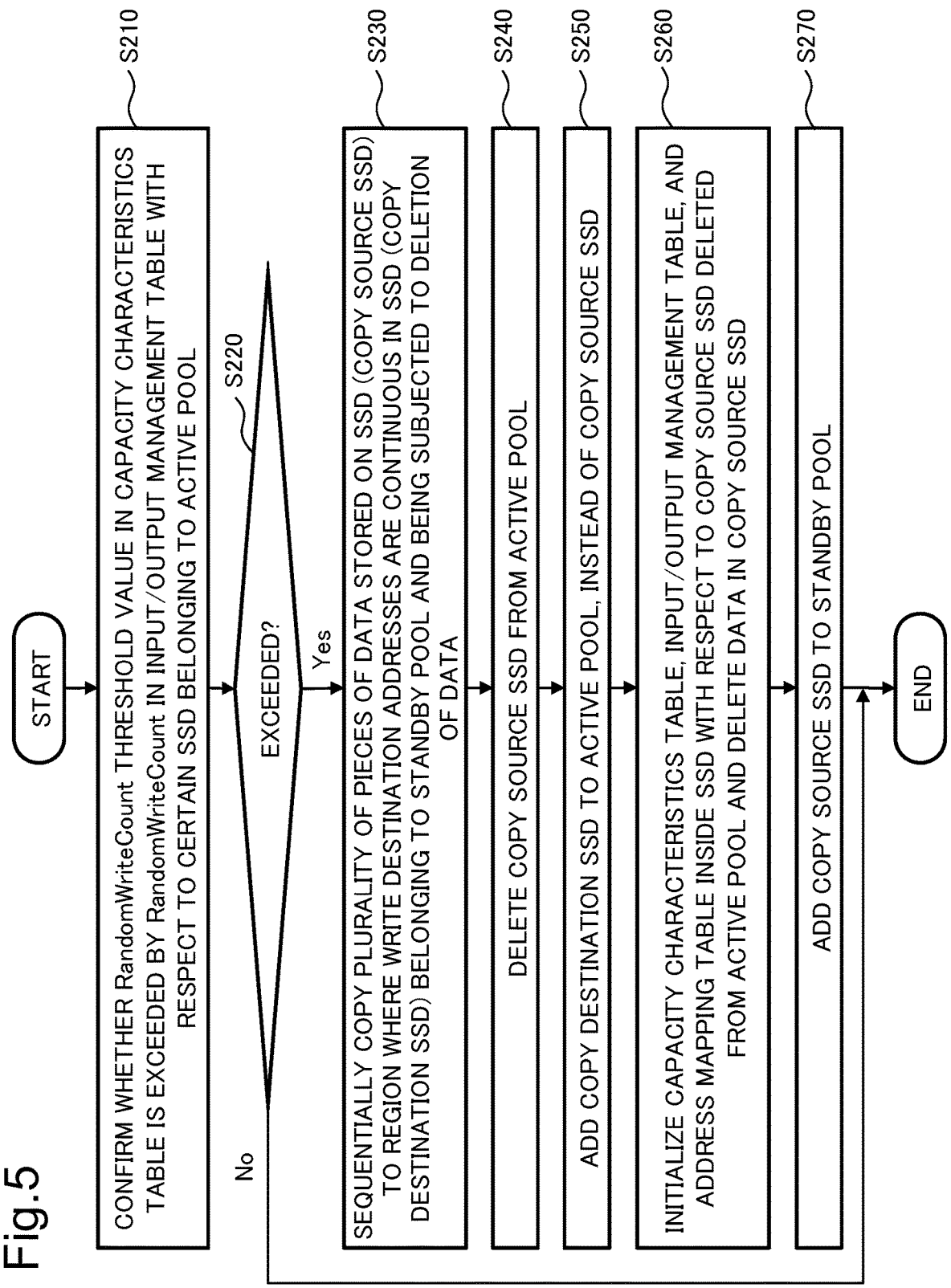
FIG. 5 is a flowchart illustrating an operation of the replacement control unit according to the first example embodiment of the present invention.

FIG. 5 is a flowchart illustrating an operation of the replacement control unit according to the first example embodiment of the present invention. The flowchart illustrated in FIG. 5 and the following description are one example, and according to appropriately required processing, a processing order may be replaced, processing may be returned, or processing may be repeated.

First, the replacement control unit 150 determines whether among SSDs 110 belonging to the active pool 120, a RandomWriteCount with respect to a first SSD exceeds a RandomWriteCount threshold value (step S210).

When the RandomWriteCount does not exceed the RandomWriteCount threshold value, the replacement control unit 150 terminates processing (No in step S220).

When the RandomWriteCount exceeds the RandomWriteCount threshold value, the replacement control unit 150 moves processing to step S230 (Yes in step S220).

Next, the replacement control unit 150 copies, in a second SSD belonging to the standby pool 140 and being not written with write data, a plurality of pieces of write data among all the write data stored on the first SSD to a region where write destination addresses are continued (step S230).

Subsequently, the replacement control unit 150 deletes the first SSD from the active pool 120 (step S240).

Subsequently, the replacement control unit 150 adds the second SSD to the active pool 120 (step S250).

Subsequently, the replacement control unit 150 initializes information relating to the first SSD in the input/output management table 180 and an address mapping table inside the first SSD and deletes data in the first SSD (step S260).

Subsequently, the replacement control unit 150 adds the first SSD to the standby pool 140 (step S270).

Initialization of an address mapping table in the SSD 110 according to the present example embodiment is described.

Figure 6:
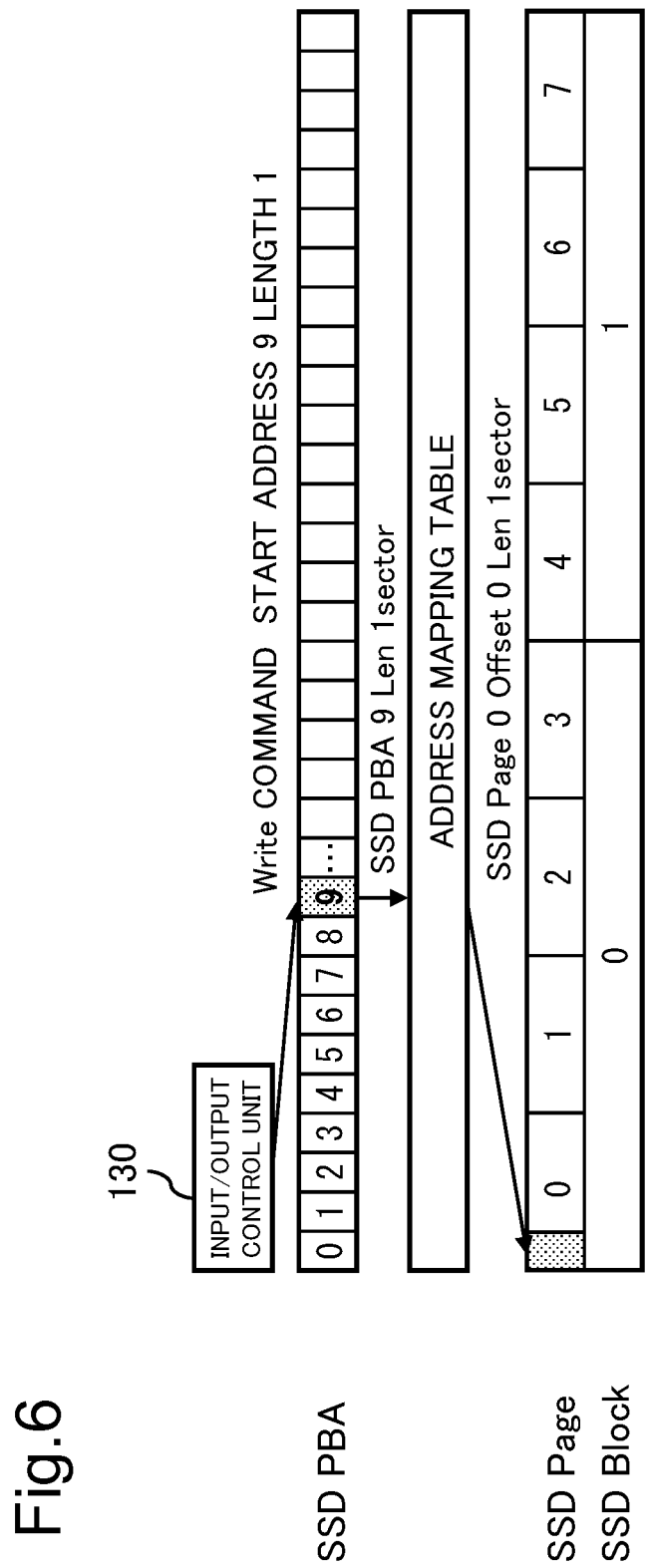
FIG. 6 is a diagram for illustrating write of data on an SSD according to the first example embodiment of the present invention.

FIG. 6 is a diagram for illustrating write of data onto an SSD according to the first example embodiment of the present invention. More specifically, FIG. 6 schematically illustrates an operation in which, for a write command received in the input/output control unit 130, write data are written on a page of the SSD 110. In FIG. 6, a column expressed as "SSD PBA" represents a PBA, a column expressed as "SSD Page" represents a page, and a column expressed as "SSD Block" represents a block.

The input/output control unit 130 allocates, when receiving a write command for the SSD 110, a page to be written with write data to a PBA of the SSD 110 and stores, as an address mapping table, a correspondence relation between the PBA and an internal address in the page. The input/output control unit 130 writes, when receiving, for example, a write command in which a start address for the SSD 110 is 9 and a length is 1, write data having a length of 1 sector onto a region in which a PBA in the SSD 110 is 9. The written write data are, inside the SSD 110, write data in which, for example, a page is 0, an offset is 0, and a length is 1 sector. At that time, the input/output control unit 130 stores, in an address mapping table, a fact that write data in which a PBA is 9 and a length is 1 sector are data in which a page is 0, an offset is 0, and a length is 1 sector inside the SSD 110.

A NAND flash memory included in the SSD 110 has a limited writable number of times for the same page, and therefore inside the SSD 110, a write destination of write data is controlled in such a way that a page is used as uniformly as possible (wear leveling processing). When random write is repeated for the SSD 110 due to wear leveling processing, fragmentation of write data written on a page inside the SSD 110 progresses and vacant pages writable with write data decrease.

FIG. 7A, FIG. 7B, FIG. 8A, and FIG. 8B each are a diagram for illustrating defragmentation processing according to the first example embodiment of the present invention. An expression method in FIG. 7A, FIG. 7B, FIG. 8A, and FIG. 8B is similar to the expression method in FIG. 6. A column expressed as "SSD Buffer" represents a work buffer for defragmentation processing.

Figure 7A:
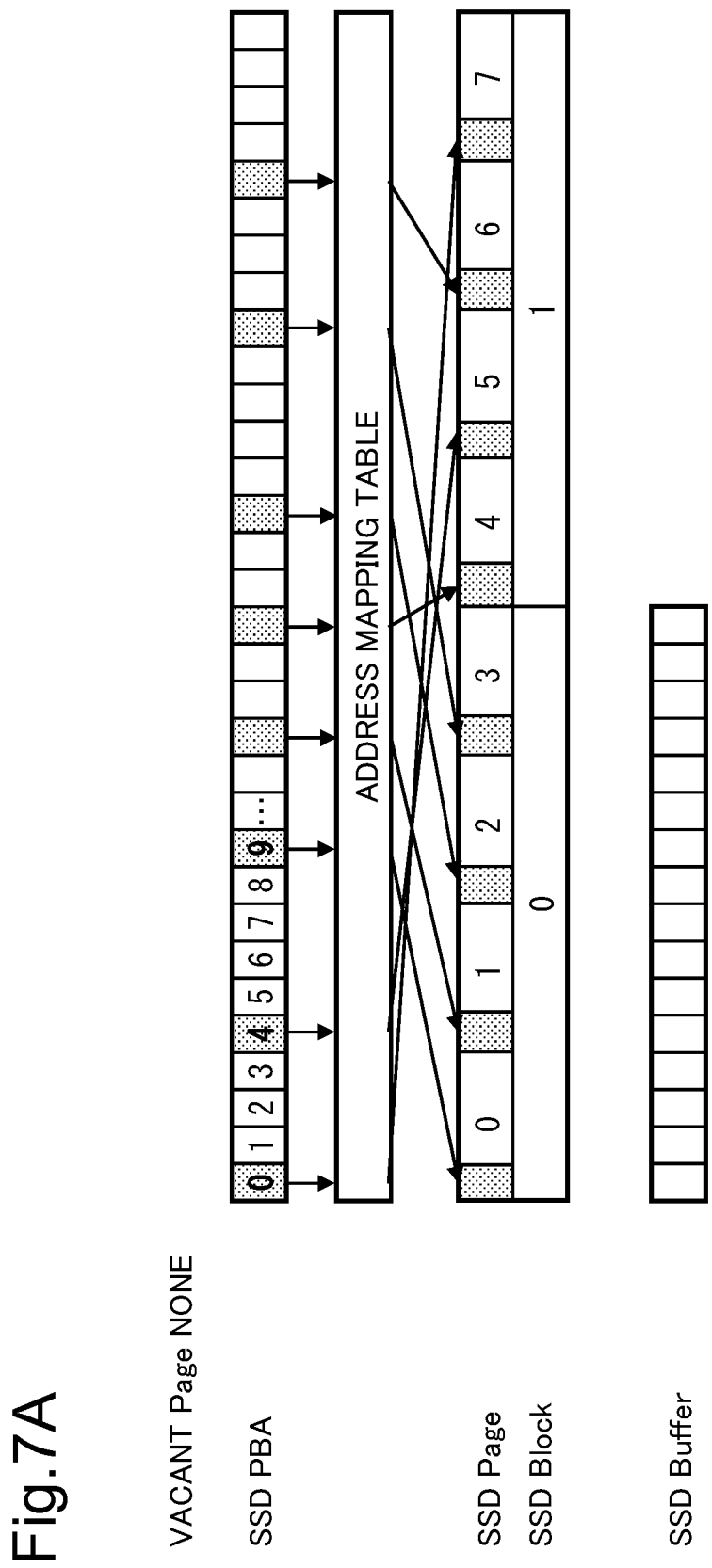
FIG. 7A is a diagram for illustrating defragmentation processing according to the first example embodiment of the present invention.

FIG. 7A illustrates a state where as a result of random write accesses, a vacant page disappears.

Figure 7B:
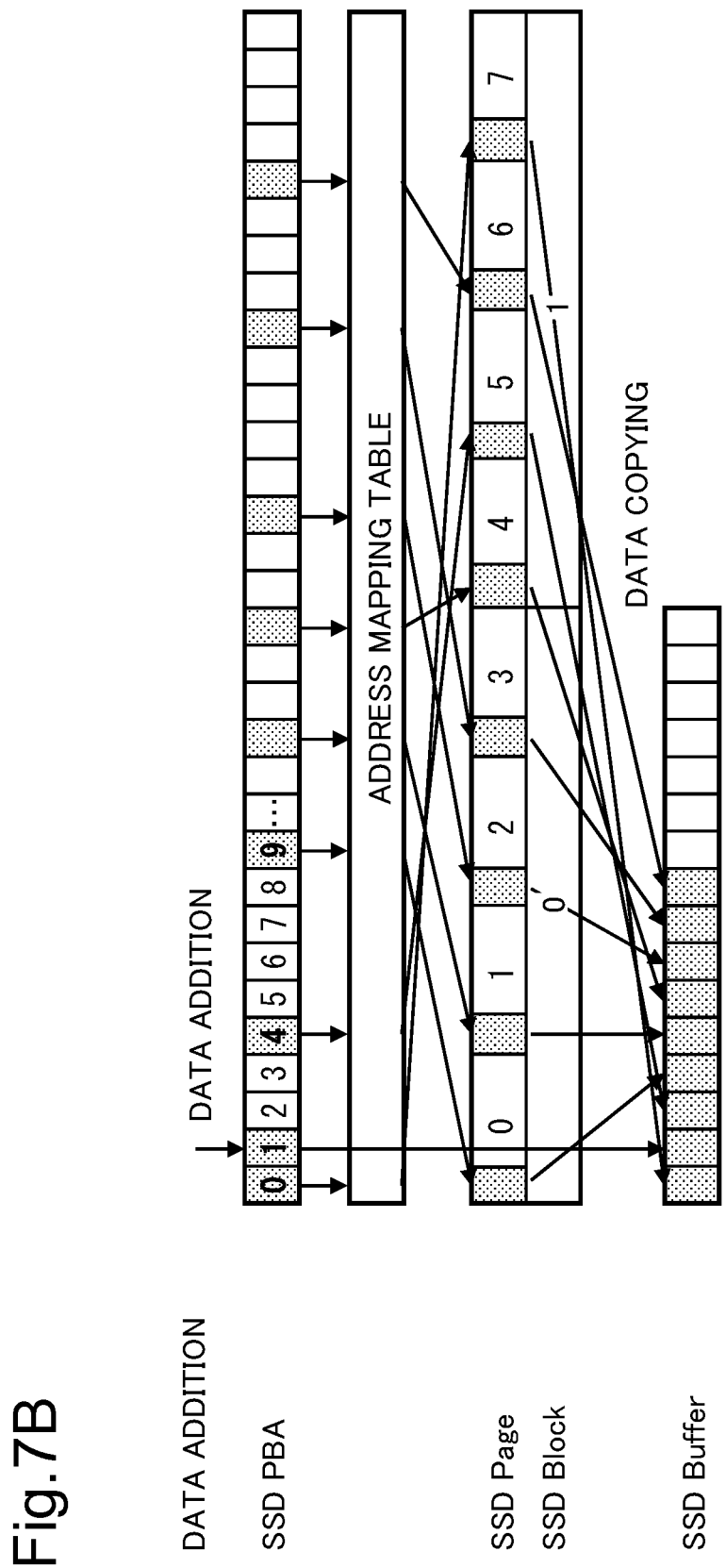
FIG. 7B is a diagram for illustrating defragmentation processing according to the first example embodiment of the present invention.

FIG. 7B illustrates a state where after a vacant page disappears, write data are added. The input/output control unit 130 copies added write data and write data written on pages to a work buffer and updates an address mapping table.

Figure 8A:
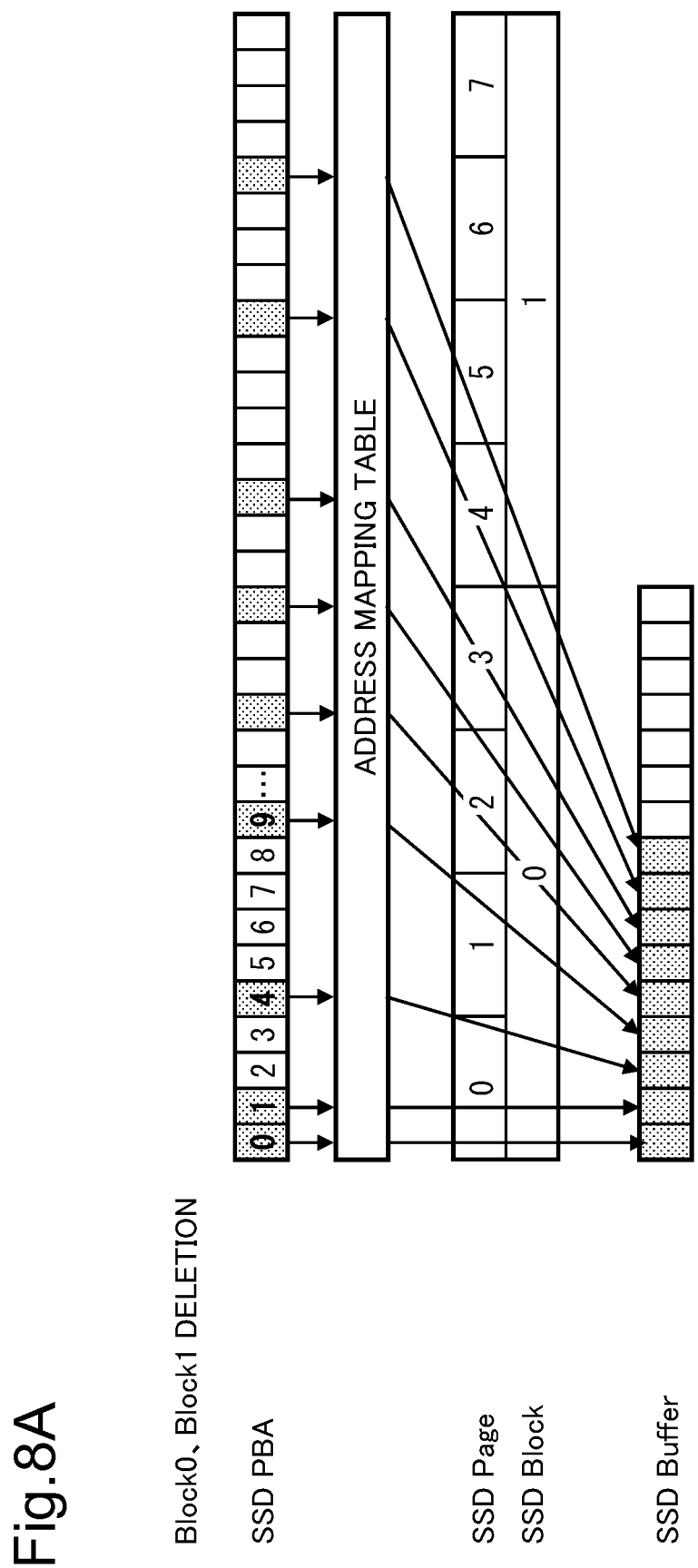
FIG. 8A is a diagram for illustrating defragmentation processing according to the first example embodiment of the present invention.

FIG. 8A illustrates a state where after write data are copied to a work buffer, the write data are deleted in a block unit. The input/output control unit 130 deletes a block including write data copied to a work buffer in the SSD 110 and generates a vacant page.

Figure 8B:
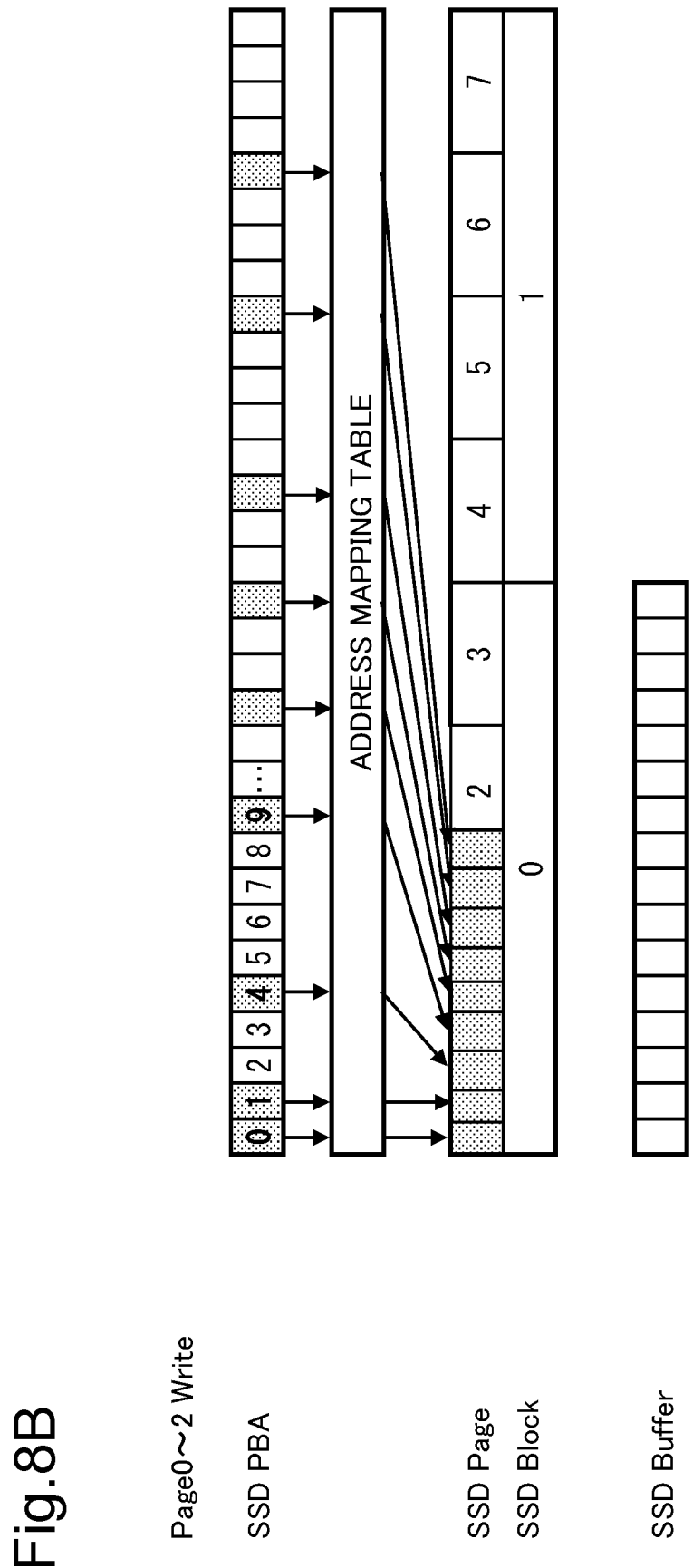
FIG. 8B is a diagram for illustrating defragmentation processing according to the first example embodiment of the present invention.

FIG. 8B illustrates a state where after a vacant page is generated, write data copied to a work buffer are continuously copied to the vacant page. The input/output control unit 130 continuously copies write data copied to a work buffer to a vacant page and updates an address mapping table.

Figure 9:
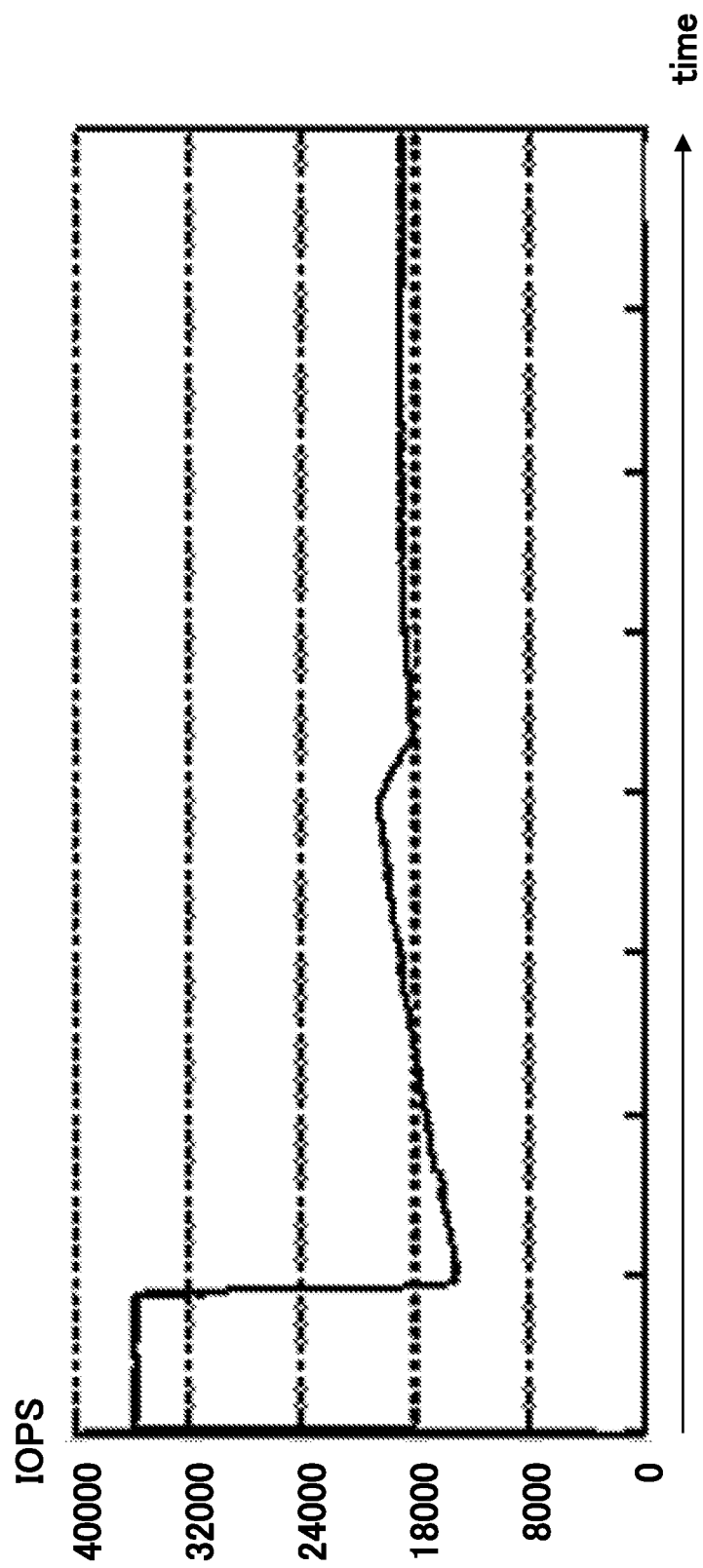
FIG. 9 is a graph illustrating one example of a change in write capacity when random data write is continued in an SSD according to the first example embodiment of the present invention.

FIG. 9 is a graph illustrating one example of a change in write capacity when random data write is continued in an SSD according to the first example embodiment of the present invention. In FIG. 9, a horizontal axis represents a time, and a vertical axis represents inputs/outputs per second.

When random write accesses to the SSD 110 are continued, fragmentation of write data progresses and defragmentation processing frequently occurs. As a result, processing of block deletion requiring a long processing time is frequently executed and input/output capacity is decreased.

Figure 10:
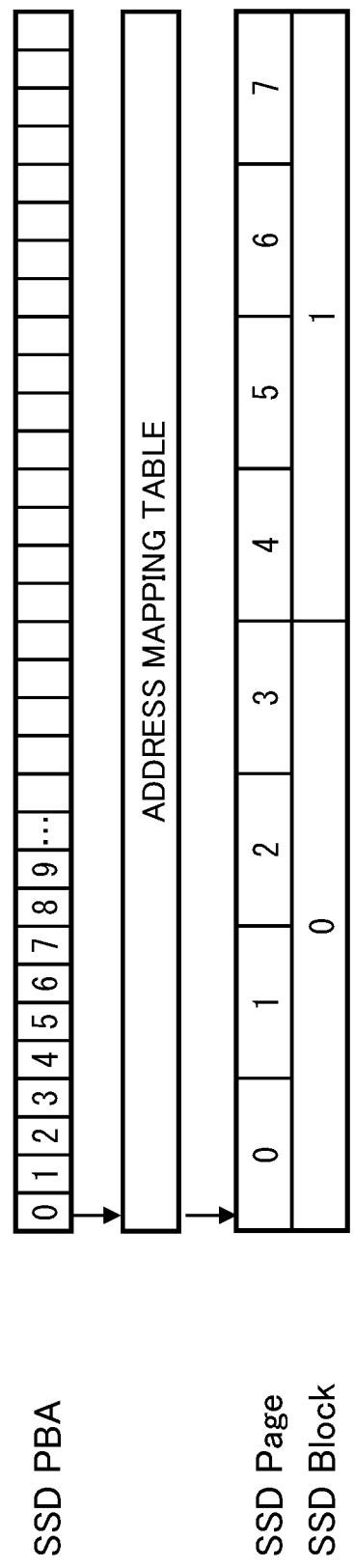
FIG. 10 is a diagram for illustrating write of sequential data on an initialized SSD according to the first example embodiment of the present invention.

FIG. 10 is a diagram for illustrating write of sequential data onto an initialized SSD according to the first example embodiment of the present invention. An expression method in FIG. 10 is similar to the expression method in FIG. 6.

When write of sequential data onto the SSD 110 is continued, write data are written on continuous pages. Therefore, fragmentation of write data does not occur and input/output capacity does not decrease.

As described above, in the disk array device 100 according to the present example embodiment, the input/output control unit 130 converts a first write instruction received from the host 200 to a second write instruction for SSDs 110 belonging to the active pool 120. The input/output control unit 130 stores, with respect to the SSD 110, a discontinuity count in which an end address and a write destination address of a newest second write instruction are discontinuous. At that time, the input/output control unit 130 stores data derivable an end address of data written in a second newest second write instruction for the SSD 110, and derives an end address, based on the data. The replacement control unit 150 copies, when a discontinuity count relating to a first SSD belonging to the active pool 120 exceeds a predetermined upper limit value of the discontinuity count relating to the first SSD, all write data stored on the first SSD to a second SSD. The second SSD belongs to the standby pool 140 and is not written with write data. The replacement control unit 150 copies, in the second SSD, a plurality of pieces of write data stored on the first SSD to a region where write destination addresses are continuous. As a result, in the second SSD, fragmentation in a region storing write data and a vacant region is resolved. The replacement control unit 150 replaces the first SSD to the second SSD in which fragmentation is resolved. In other words, it is unnecessary for the disk array device 100 to repeatedly count a discontinuity count in pages of each SSD 110 in processing necessary for determining whether defragmentation is required. Therefore, the disk array device 100 according to the present example embodiment produces an advantageous effect of being able to reduce a load required for determining whether defragmentation is required in the disk array device 100.

In the disk array device 100 according to the present example embodiment, processing necessary for determining whether defragmentation is required is simplified, and therefore there is an advantageous effect of being achievable the input/output control unit 130, by using more inexpensive hardware.

In the disk array device 100 according to the present example embodiment, the replacement control unit 150 adds, after initializing a first SSD deleted from the active pool 120, the initialized first SSD to the standby pool 140. Therefore, the disk array device 100 according to the present example embodiment produces an advantageous effect of being able to automatically maintain an SSD 110 included in the standby pool 140.

In the disk array device 100 according to the present example embodiment, initialization of the SSD 110 is achieved by using a standard function (a TRIM command or a Secure Erase command of SATA or an UNMAP command of SAS and the like) provided in a commercially available SSD. In other words, in the disk array device 100, a special function and a special interface for executing defragmentation in the SSD 110 from an outside of the SSD 110 are not required. Therefore, the disk array device 100 according to the present example embodiment produces an advantageous effect of being achievable by using an inexpensive and standard SSD without using a dedicated SSD.

Figure 11:
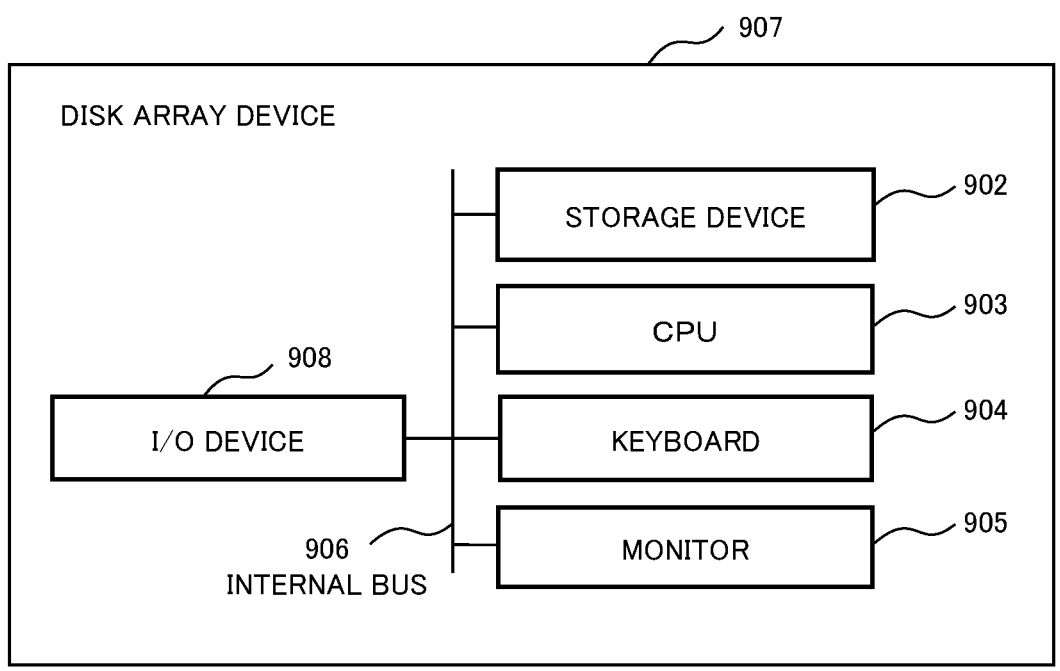
FIG. 11 is a block diagram illustrating one example of a hardware configuration capable of achieving the disk array device according to the example embodiment of the present invention.

FIG. 11 is a block diagram illustrating one example of a hardware configuration capable of achieving the disk array device according to the example embodiment of the present invention.

A disk array device 907 includes a storage device 902, a central processing unit (CPU) 903, a keyboard 904, a monitor 905, and an input/output (I/O) device 908, and these are connected by an internal bus 906. The storage device 902 stores an operation program of the CPU 903 for the input/output control unit 130 and the replacement control unit 150 and the like. The CPU 903 entirely controls the disk array device 907, executes an operation program stored in the storage device 902, and executes a program for the input/output control unit 130, the replacement control unit 150, and the like, and transmits/receives data, based on the I/O device 908. The internal configuration of the disk array device 907 above is one example. The disk array device 907 may be, as necessary, a device configuration connected with the keyboard 904 and the monitor 905.

The disk array device 907 according to the above-described example embodiment of the present invention may be achieved by a dedicated device but is achievable by a computer (information processing device) except an operation of hardware performing communication with an outside by using the I/O device 908. According to the example embodiment of the present invention, the I/O device 908 is, for example, an input/output unit for the host 200 and the like. In this case, the computer reads a software program stored in the storage device 902 onto the CPU 903 and executes the read program in the CPU 903. In the case according to the above-described example embodiment, in the software program, description achievable a function of each of units, as described above, of the disk array device 100 illustrated in FIG. 1 may be made. However, it is assumable that these units include also hardware, as appropriate. In such a case, it is conceivable that the software program (computer program) configures the present invention. It is conceivable that a computer readable storage medium storing the software program also configures the present invention.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-031468, filed on Feb. 26, 2018, the disclosure of which is incorporated herein in its entirety by reference.

INDUSTRIAL APPLICABILITY

The present invention is applicable to applications for resolving fragmentation in an SSD constituting a disk array device.

REFERENCE SIGNS LIST

100 Disk array device
110 SSD
120 Active pool
130 Input/output control unit
140 Standby pool
150 Replacement control unit
160 Interface
170 Capacity characteristics table
180 Input/output management table
200 Host
902 Storage device
903 CPU
904 Keyboard
905 Monitor
906 Internal bus
907 Disk array device
908 I/O device

What is claimed is:
1. A disk array device comprising:
a plurality of solid state drives (SSDs) including an active SSD pool comprising a first set of the SSDs that are available as write destinations and a standby SSD pool comprising a remainder of the SSDs that are not available as write destinations;
an input/output control configured to receive from a host a plurality of first write instructions that each include respective write data to be written to the active SSD pool and, for each first write instruction:
for each SSD belonging to the active SSD pool, convert the respective first write instruction to a respective second write instruction and provide the respective second write instruction to the respective SSD, the respective second write instruction including the respective write data and a respective start physical address at which the write data is to be stored in the respective SSD,
wherein each SSD in the active SSD pool is configured to, for each first write instruction:
receive the respective second write instruction;
determine a respective start internal address corresponding to the respective start physical address; and
write the respective write data beginning at the respective start internal address and ending at a respective actual end internal address,
wherein the input/output controller is further configured to, for each first write instruction and for each SSD in the active SSD pool:
derive a respective expected end internal address corresponding to the respective actual end internal address at which writing of the respective write data ended;
detect whether there is a discontinuity between the respective expected end internal address and the respective actual end internal address; and
in response to detecting the discontinuity, increment a respective discontinuity count for the respective SS, and
a replacement control unit configured to, when the respective discontinuity count relating to a first SSD belonging to the active SSD pool exceeds a predetermined upper limit value:
indicate an allowable decrease in write capacity in the first SSD;
copy the write data stored on the first SSD to a region of continuous write destination addresses in a second SSD belonging to the standby SSD pool;
remove the first SSD from the active SSD pool; and
add the second SSD to the active SSD pool.
2. A control method for a disk array including a plurality of solid state drives (SSDs) including an active SSD pool comprising a first set of the SSDs that are available as write destinations and a standby SSD pool comprising a remainder of the SSDs that are not available as write destinations, the control method comprising:
receiving from a host a plurality of first write instructions that each include respective write data to be written to the active SSD pool and, for each first write instruction:
for each SSD belonging to the active SSD pool, converting the respective first write instruction to a respective second write instruction and provide the respective second write instruction to the respective SSD, the respective second write instruction including the respective write data and a respective start physical address at which the write data is to be stored in the respective SSD,
wherein each SSD in the active SSD pool is configured to, for each first write instruction:
receive the respective second write instruction;
determine a respective start internal address corresponding to the respective start physical address; and
write the respective write data beginning at the respective start internal address and ending at a respective actual end internal address,
wherein the control method further comprises, for each first write instruction and for each SSD in the active SSD pool:
deriving a respective expected end internal address corresponding to the respective actual end internal address at which writing of the respective write data ended;
detecting that there is a discontinuity between the respective expected end internal address and the respective actual end internal address;
in response to detecting the discontinuity, incrementing a respective discontinuity count for the respective SSD, wherein for a first SSD belonging to the active SSD pool, the respective discontinuity count exceeds a predetermined upper limit value,
and wherein the control method further comprises, in response to the respective discontinuity count relating to the first SSD belonging to the active SSD pool exceeding the predetermined upper limit value:
indicating an allowable decrease in write capacity in the first SSD;
copying the write data stored on the first SSD to a region of continuous write destination addresses in a second SSD belonging to the standby SSD pool;
removing the first SSD from the active SSD pool; and
adding the second SSD to the active SSD pool.

3. A non-transitory storage medium storing a control program for a disk array device,
including a plurality of solid state drives (SSDs) including an active SSD pool comprising a first set of the SSDs that are available as write destinations and a standby SSD pool comprising a remainder of the SSDs that are not available as write destinations, the control program executable by the disk array device to perform processing comprising:
receiving from a host a plurality of first write instructions that each include respective write data to be written to the active SSD pool and, for each first write instruction:
for each SSD belonging to the active SSD pool, converting the respective first write instruction to a respective second write instruction and provide the respective second write instruction to the respective SSD, the respective second write instruction including the respective write data and a respective start physical address at which the write data is to be stored in the respective SSD, wherein each SSD in the active SSD pool is configured to, for each first write instruction:
receive the respective second write instruction;
determine a respective start internal address corresponding to the respective start physical address; and
write the respective write data beginning at the respective start internal address and ending at a respective actual end internal address,
wherein the processing further comprises, for each first write instruction and for each SSD in the active SSD pool:
deriving a respective expected end internal address corresponding to the respective actual end internal address at which writing of the respective write data ended;
detecting whether there is a discontinuity between the respective expected end internal address and the respective actual end internal address; and
in response to detecting the discontinuity, increment a respective discontinuity count for the respective SSD,
and wherein the processing further comprises, when the respective discontinuity count relating to a first SSD belonging to the active SSD pool exceeds a predetermined upper limit value:
indicating an allowable decrease in write capacity in the first SSD;
copying the write data stored on the first SSD to a region of continuous write destination addresses in a second SSD belonging to the standby SSD pool;
removing the first SSD from the active SSD pool; and
adding the second SSD to the active SSD pool.

* * * * *